Feb. 25, 1964  D. G. ROGERS ETAL  3,121,937
METHOD OF CLOSURE
Filed Sept. 23, 1960
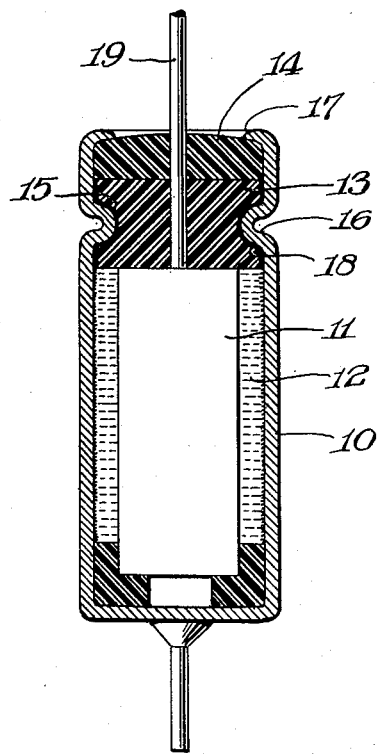
INVENTORS
Donald G. Rogers
Franklin D. Frantz, Jr.
BY Connolly and Hutz
ATTORNEYS 3,121,937
METHOD OF CLOSURE
Donald G. Rogers, Pownal, and Franklin D. Frantz, Jr., Woodford, Vt., assignors to Sprague Electric Company, North Adams, Mass., a corporation of Massachusetts
Filed Sept. 23, 1960, Ser. No. 58,070
4 Claims. (Cl. 29—25.31)

This invention relates to an improved process for end closing a capacitor containing a film forming electrolyte and more particularly to the process for producing an end seal for a tantalum anode electrolytic capacitor.

Tantalum anode capacitors employing liquid electrolytes have porous anodes and a corrosive film forming electrolyte contained in a metal can that is closed by an end plug. The end plug closure hermetically seals the capacitor. The plug closure is made up of a vapor barrier plug and means associated with the plug at the end of the metal can to provide a block to the escape of the electrolyte or ingress of contaminants into the capacitor. This closure in one form includes a tacky, adhesive material which serves as a stuffing around the plug and between the plug and the inside surface of the can wall. The plug is provided with a groove which girdles the plug and receives the can wall when it is worked to contact the groove by a spinning operation on the can end. The tacky soft adhesive material forms an obstruction at the groove and the crimp in the can wall to block any passage between the plug and the can. This sealing material combines with the vapor barrier plug to close the end of the can. The adhesive material cooperates with both the inner surface of the can wall at the end and with the plug.

In assembling the capacitor containing this end seal, the parts are assembled with the adhesive material located in the groove of the plug when the plug is inserted in the can. Upon forming the crimp in the can wall to perfect the end seal the adhesive material is spun from the groove to fill the area between the interfaces of the plug and the can wall. The adhesive material thus is stuffed between the surface of the inner wall of the can at the end seal and the surface of the plug. This continuous connection of the soft tacky material adapts itself to the usage of the capacitor under various conditions without breach and provides a constant and perpetual barrier to escape or ingress past the groove and crimp combination.

The end seal to be completely effective depends upon good contact between the continuous sealing material and the two surfaces, the outer surface of the plug and the inner surface of the can. Various problems are encountered in bringing about this good contact.

It is an object of this invention to produce a tantalum liquid electrolyte capacitor end seal having a permanent and continuous obstruction to the escape of electrolyte by a process which insures good contact between the blocking material and the surfaces.

A further object of this invention is to provide a sealing process in the manufacture of a liquid electrolyte tantalum capacitor in which a tacky adhesive sealing material is in contact with the surfaces of a plug in the end of the capacitor and the inner surface of the capacitor can wall.

Still further objects of this invention will become more apparent upon consideration of the following description taken together with the drawing, which shows a tantalum electrolyte capacitor in a vertical section.

In general, this invention provides an improved process of producing an end seal for miniature capacitors in which a liquid electrolyte is contained in the can by a plug and a sealing material adhered around the plug within the end of the can. The capacitor produced by this invention is illustrated in the figure and is made up of a cylindrical metallic container 10 having a porous anode 11 and a film-forming electrolyte 12. The silver can is platinized on its inner surface to increase its apparent surface as described in U.S. Patent 3,082,360, issued March 19, 1963, to Robinson and Millard. A substantially rigid plug 13 preferably composed of polytetrafluoroethylene is fitted in the open end of the container 10. The plug means for the open end in the illustrated embodiment also includes the wafer gasket 14. The wafer gasket 14 is preferably more resilient than the polytetrafluoroethylene of the plug 13 and functions to fill the mouth of the container 10. A suitable material for wafer 14 is a saturated copolymer of chlorotrifluoroethylene and vinylidene chloride (Kel-F Elastomer). The plug 13 has a groove 15 preformed in its lateral well. The container 10 is formed with a crimp 16 which fits into and conforms to the groove 15. The upper edge of the container 10 is also spun over to form a lip 17 which engages the wafer 14. The groove 15 extends inwardly around the circumference of the plug 13 and is spaced at about midway up the side of the plug 13. This groove 15 is formed in the plug before it is assembled into the container 10.

A sealing material of a soft, tacky adhesive substance forms a layer 18 which lies between the plug 13 and the container 10 in the region of the plug 13. The sealing material 18 is a soft, tacky adhesive highly impermeable to gases and flexible at low temperatures. It is resistant to corrosive liquids such as sulfuric acid. A preferred material is polybutadiene but other materials are useful such as polyisobutylene. It is a feature of these substances that they form a permanent adherence on both the polytetrafluoroethylene of the plug 13 and the metal surface of the container 10. The sealing material is particularly effective in plugging the capacitor at low temperatures down to $-50°$ C. in which range polytetrafluoroethylene suffers a loss of resiliency while the sealing material of this invention remains resilient. It is preferable that the soft, tacky material have a viscosity ranging from over 50 cps. to not more than 100,000 cps. It is a feature that the sealing material remains soft and tacky when not polymerized as by exposure to air. In the assembled capacitor a substantial portion of the sealing material remains soft and tacky in a non-solid condition.

In the specific embodiment illustrated in the figure, the porous anode 11 is made up from a fine grain powder which is sintered into a coherent body. An oxide is formed on the surfaces of this anode by passing a current through an electrolyte in contact with the anode resulting in the formation of $Ta_2O_5$. Suitable formation electrolytes for the conventional formation step include phosphoric and oxalic acids and ammonium chloride. The tantalum oxide film is a dielectric in contact with the electrolyte 12. The container 10 may be made of silver and acts as the cathode for the capacitor. A connection is made to the anode through the lead wire 19 which is suitably fastened to the anode 11 as by a weld at the top of the anode 11.

According to this invention the capacitor is produced by assembling the anode 11 in the container 10 with the plug 13 and the wafer 14 positioned on the lead wire 19. The sealing material is applied to and adheres to the plug 13. The sealing material is contained in the groove 15. The plug containing the sealing material easily fits within the end of the container. The wafer 14 fits in the container on top of the plug 13.

In one process according to this invention silica gel having about 50% water is deposited in the container 10. After the anode 11 has been positioned in the container 10, 50–70% concentrated sulfuric acid is introduced into the container 10 and added to the silica within the container 10. The sulfuric acid and silica are permitted to set for from one to two hours. At the end of this period the sulfuric acid has gelled to a final gelled electrolyte of 40% concentrated sulfuric acid. This gelled electrolyte has become impregnated in the porous anode. The gelling of the sulfuric acid can be accelerated by heating. The gelled electrolyte is confined to the area within the container 10 below the plug 13.

The method of assembly is continued. The plug 13 is positioned for sealing and is then secured in the container 10 by forming of the wall of the container 10 with the crimp 16. This spreads the sealing material and forms the stuffing layer 18. The capacitor is ready for aging, testing and then use. Among other advantages this invention provides a high reliability in the seal of the capacitor at the plug 13. The failures of this seal are almost non-existent.

It is a theory of this invention that the gelling of the electrolyte withdraws the electrolyte from the area of the can end and the plug. The electrolyte is not present in the area of the layer 18 during the step of forming the crimp 16. Thus, a tight closure is assured. This results in an unexpected improvement in the reliability of the seal and thus facilitates the production of the capacitor.

In the description one embodiment of this invention is set forth for the purpose of illustration. It will be understood that modifications may be introduced into this illustration without departure from the spirit of this invention and it is intended that the scope thereof be limited only by the appended claims.

What is claimed is:

1. A process for providing an end seal in a miniature electrolytic tantalum capacitor having a plug composed of a vapor barrier material and an adhesive stuffing material comprising the steps of depositing a gelling composition in a metallic capacitor casing, introducing concentrated sulfuric acid into the casing, mixing said concentrated sulfuric acid and said gelling composition to produce a gelled electrolyte confined to a portion of said casing, impregnating a porous tantalum anode positioned in the casing with the gelled electrolyte, placing a circumferentially grooved plug composed of a vapor barrier material in the end of the casing carrying a tacky adhesive stuffing material in the groove, forming the casing wall at the area which is justaposed to said plug groove and free of the gelled electrolyte with a crimp which fits into the groove in the plug and spreads the stuffing material across the surface between the plug and the casing to produce a stuffing layer between the plug and the casing whereby the stuffing layer blocks passage around the plug by adhesion of said stuffing material to the plug surface and the casing wall.

2. A process for closing a cylindrical metal container for a capacitor anode immersed in a mobile electrolyte in the container comprising the steps of depositing a gelling composition in a metallic capacitor casing, introducing concentrated sulfuric acid into the casing, mixing said concentrated sulfuric acid and said gelling composition within the casing to produce a gelled electrolyte confined to a portion of said casing, impregnating a porous anode positioned in the container with said gelled electrolyte, preforming a circumferential groove inwardly of a cylindrical polytetrafluoroethylene end plug for said casing, depositing a tacky adhesive material in the preformed groove, positioning the plug in the electrolyte-free area of the casing, forming a crimp of the casing wall at the groove in the plug, contacting the groove with said crimp and squeezing the tacky adhesive into adhesion with the juxtaposed surfaces of the plug and the casing, whereby the stuffing material blocks passage from the interior of the casing around the plug into and out of the casing in a range of operating temperatures down to −50° C.

3. The process of claim 2 in which the metallic capacitor casing consists of silver, the crimp thereof conforming to the preformed groove of the polytetrafluoroethylene plug.

4. A process for providing an end seal in a miniature electrolytic tantalum capacitor having a plug composed of a vapor barrier material and an adhesive stuffing material comprising the steps of depositing a gelling composition within a portion of a metallic capacitor casing, introducing a corrosive liquid electrolyte into the casing, mixing the liquid electrolyte in the gelling composition, withdrawing the liquid electrolyte away from the open end of the casing and producing a gelled electrolyte, impregnating the gelled electrolyte in a porous capacitor anode positioned in the casing, placing in the end of the casing a circumferentially grooved plug composed of a vapor barrier material carrying a tacky adhesive stuffing material in the groove, forming the casing wall at the area which is free of the gelled electrolyte and juxtaposed to said plug groove with a crimp which fits into the groove and spreads the stuffing material across the surface between the plug and the casing to produce a stuffing layer between the plug and the casing whereby the stuffing layer blocks passage around the plug by adhesion of said stuffing material to the plug surface and the casing wall.

References Cited in the file of this patent

UNITED STATES PATENTS

| | | |
|---|---|---|
| 2,776,467 | Brennan | Jan. 8, 1957 |
| 2,825,855 | Frekko | Mar. 4, 1958 |
| 2,851,642 | Schaeren | Sept. 9, 1958 |